Patented Dec. 12, 1933

1,938,751

UNITED STATES PATENT OFFICE 1,938,751

RUBBER-LIKE MASS CONTAINING OLEFINE NAPHTHALENE POLYMERIZATES

Kurt Meisenburg, Leverkusen-I. G. Werk, and Walter Bock, Cologne-Mulheim, Germany, assignors to I. G. Farbenindustrie Aktiengesellschaft, Frankfort-on-the-Main, Germany No Drawing. Original application July 10, 1930, Serial No. 467,125, and in Germany April 25, 1930. Divided and this application May 15, 1933. Serial No. 671,283

8 Claims. (Cl. 260—6)

The present invention relates to a process of preparing mixed rubber-like masses and to the new mixed rubber-like masses obtainable by the said process.

In accordance with the invention new mixed rubber-like masses are obtained by causing complete interpenetration of the polymerization product of a butadiene hydrocarbon, more particularly, of a hydrocarbon of the probable formula:—

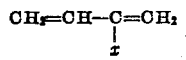

$$CH_2=CH-C=CH_2$$
$$\phantom{CH_2=CH-}\underset{x}{|}$$

wherein $x$ means hydrogen or methyl, with a polymerization product of an olefine naphthalene, such as alpha-vinyl-naphthalene, polyvinylnaphthalenes, homologues of these compounds and the like. The effecting of complete interpenetration of the butadiene hydrocarbon- and olefine naphthalene polymerizate is best performed by mixing the different hydrocarbons and causing polymerization of the mixture either by simple heating, for example, to about 40–80° C., or in emulsion with water and an emulsifying agent or an emulsoid colloid, preferably while gently heating the emulsion to about 30–70° C., while shaking or stirring the mixture. It will be likewise possible to intimately mix incompletely polymerized butadiene hydrocarbons with incompletely polymerized olefine naphthalenes, which polymerized products should still possess a somewhat viscous character, by mechanical means, and causing further polymerization of the mixtures thus obtained according to one of the processes above mentioned with or without the addition of further butadiene hydrocarbons and/or olefine naphthalene hydrocarbons. Obviously, our mixed rubber-like masses can also be obtained by at first partially polymerizing a butadiene hydrocarbon, then adding an olefine naphthalene hydrocarbon and further polymerizing according to one of the methods described above or vice versa.

It may be mentioned that in the claims the expression "effecting complete interpenetration" of the various polymerizates is intended to define the modifications defined above. Obviously, also such processes are within the scope of this expression in which ingredients known to favorably influence the polymerization processes in question, such as oxygen, substances splitting off oxygen under the conditions of working, metal oxides, electrolytes and the like are employed.

The different hydrocarbons or the incompletely polymerized products should be applied in such amounts that the finished rubber-like masses contain below about 45% by weight of the olefine naphthalene polymerizate. The best results are generally obtained when employing the olefine naphthalene in an amount that the mixed rubber-like masses contain between about 15–40% by weight of the olefine naphthalene polymerizate.

Instead of the pure butadiene hydrocarbons or pure olefine naphthalenes the cheaper technical raw products or mixtures of butadiene with isoprene and/or mixtures of different olefine naphthalenes or the incompletely polymerized products of said products may be employed in many cases with good results.

It will be of advantage in some cases to add before or during the polymerization rather small amounts of other diolefine hydrocarbons, such as 2.3-dimethylbutadiene, phenylbutadiene or the like, by which additions the character of the final products can be somewhat altered.

The mixed polymerization products thus obtainable are in contradistinction to many other artificial rubber-like masses very plastic and easily workable on rollers, and yield vulcanization products of high technical value, especially when vulcanized after the addition of a suitable soot variety.

It may be mentioned that the use of olefine naphthalenes compared with the use of olefine benzenes has the advantage that the mixed polymerizates containing olefine naphthalenes are generally obtained in a better yield than those containing olefine benzenes, and that they are generally still more plastic and more easily workable on rollers. Olefine benzenes and olefine naphthalenes can therefore not be considered as equivalents in polymerization processes.

As mentioned above our new mixed polymerization products are very plastic and easily workable on rollers, in consequence of which fact they very easily take up fillers, such as soot, colloidal silicic acid, aluminium oxide, zinc oxide and the like, vulcanizing agents, such as sulfur, selenium etc. vulcanization accelerators, plasticizing agents, dyestuffs and other ingredients usually applied in vulcanization processes.

It may be mentioned that the formation of mixed polymerization products of pronounced and valuable rubber-like properties according to the present invention is most surprising, since olefine naphthalene polymerizates are generally resins and not rubber-like products.

Furthermore, it should be pointed out that the valuable rubber-like polymerization products described and claimed herein are not obtained when simply mixing completely polymerized products from butadiene or isoprene and from olefine naphthalene hydrocarbons, nor are the valuable polymerizates of the present invention obtained, when, for example, alpha-vinylnaphthalene or another olefine naphahtlene hydrocarbon is polymerized in the presence of completely polymerized butadiene or isoprene or vice versa. Likewise, mixed polymerization products obtainable by mixing solutions of, for example, completely polymerized alpha-vinylnaphthalene with solutions of completely polymerized butadiene or isoprene and evaporating of the solvent do not possess the valuable properties of our new rubber-like masses, it being a characteristic feature of the present invention that both the olefine naphthalene and the butadiene or isoprene component must still be polymerizable and must be polymerized in admixture with one another.

The following examples illustrate our invention, without limiting it thereto, the parts being by volume:—

Example 1

65 parts of butadiene-(1.3), 10 parts of alpha-vinylnaphthalene, 100 parts of a 10% aqueous solution of sodium oleate and 3 parts of 1/1 normal caustic soda solution are emulsified in a pressure vessel and polymerized with agitation for 5 days at 60° C. A cream-like paste is obtained, which can be coagulated by acidification or by cooling. The yield of the coagulate obtained amounts to about 90% of the theoretical amount. On vulcanizing the coagulation product with the addition of lamp black, a soft rubber-like mass of high tensile strength and elasticity is obtained.

By employing in the above example 8 parts of 1/1 normal caustic soda solution instead of the 3 parts mentioned, the yield of the polymerization product is increased for about 3–5%. The mixed rubber-like mass thus obtainable yields a vulcanization product similar to that described in the first part of the example, but possesses a considerably higher stretch.

Example 2

75 parts of butadiene-(1.3), 20 parts of alpha-vinylnaphthalene, 100 parts of a 10% aqueous solution of sodium oleate and 3 parts of 1/1 normal caustic soda solution are emulsified and polymerized as described in Example 1. After coagulation of the latex like mass, a strong plastic polymerization product is obtained in a yield of about 94% of the theoretical amount and the vulcanization product of the latter, besides possessing a high tensile strength and a good elasticity, is especially distinguished by a good stretch.

Example 3

68 parts of butadiene-(1.3) and 20 parts of vinylnaphthalene are emulsified with 80 parts of a 2% aqueous solution of the hydrochloride of the diethylaminoethoxyanilide of oleic acid, and the emulsion is agitated for 4 days at 60° C. A latex-like paste is obtained in an almost quantitative yield, from which the mixed rubber-like mass can be obtained by coagulation.

This is a division of our co-pending application Serial No. 467,125 filed July 10th, 1930, now Patent 1,915,745 of June 27, 1933.

We claim:—

1. The process which comprises effecting complete interpenetration of a heat or emulsion polymerizate derived from a compound of the probable formula:—

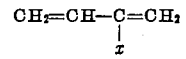

wherein $x$ stands for hydrogen or methyl, with a heat or emulsion polymerizate derived from a vinyl naphthalene hydrocarbon in such a manner that the mixed polymerizate contains below about 45% by weight of the vinyl naphthalene polymerizate.

2. The process which comprises effecting complete interpenetration of a heat or emulsion polymerizate derived from a compound of the probable formula:—

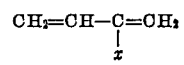

wherein $x$ stands for hydrogen or methyl, with a heat or emulsion polymerizate derived from a vinyl naphthalene hydrocarbon in such a manner that the mixed polymerizate contains between about 15–40% by weight of the vinyl naphthalene polymerizate.

3. The process which comprises effecting complete interpenetration of a heat or emulsion polymerizate derived from a compound of the probable formula:—

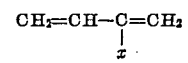

wherein $x$ stands for hydrogen or methyl, with a heat or emulsion polymerizate derived from alpha-vinylnaphthalene, in such a manner that the mixed polymerizate contains below about 45% by weight of the alpha-vinylnaphthalene polymerizate.

4. The process which comprises incorporating and effecting complete interpenetration of a heat or emulsion polymerizate derived from a compound of the probable formula:—

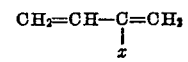

wherein $x$ stands for hydrogen or methyl, with a heat or emulsion polymerizate derived from alpha-vinylnaphthalene in such a manner that the mixed polymerizate contains between about 15–40% by weight of the alpha-vinylnaphthalene polymerizate.

5. The polymerization products obtained according to the process claimed in claim 1, said polymerization products possessing a good plasticity, easily taking up ingredients usually applied in vulcanization processes and yielding, when vulcanized in the presence of carbon black, vulcanization products of high tensile strength and superior resistance to abrasion.

6. The polymerization products obtained according to the process claimed in claim 2, said polymerization products possessing a good plasticity, easily taking up ingredients usually applied in vulcanization processes and yielding, when vulcanized in the presence of carbon black, vulcanization products of high tensile strength and superior resistance to abrasion.

7. The polymerization products obtained according to the process claimed in claim 3, said polymerization products possessing a good plasticity, easily taking up ingredients usually applied in vulcanization processes and yielding, when vulcanized in the presence of carbon black, vulcanization products of high tensile strength and superior resistance to abrasion.

8. The polymerization products obtained according to the process claimed in claim 4, said polymerization products possessing a good plasticity, easily taking up ingredients usually applied in vulcanization processes and yielding, when vulcanized in the presence of carbon black, vulcanization products of high tensile strength and superior resistance to abrasion.

KURT MEISENBURG.
WALTER BOCK.